(12) United States Patent
Ito et al.

(10) Patent No.: US 12,340,253 B2
(45) Date of Patent: Jun. 24, 2025

(54) MANAGEMENT DEVICE AND MANAGEMENT METHOD

(71) Applicant: MAZDA MOTOR CORPORATION, Hiroshima (JP)

(72) Inventors: Seiichi Ito, Higashihiroshima (JP); Masashi Okamura, Hiroshima (JP); Takashi Maeda, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 18/684,853

(22) PCT Filed: Aug. 23, 2022

(86) PCT No.: PCT/JP2022/031693
§ 371 (c)(1),
(2) Date: Feb. 20, 2024

(87) PCT Pub. No.: WO2023/032750
PCT Pub. Date: Mar. 9, 2023

(65) Prior Publication Data
US 2024/0354167 A1    Oct. 24, 2024

(30) Foreign Application Priority Data

Aug. 31, 2021    (JP) .................................. 2021-140684

(51) Int. Cl.
*G06F 15/16*         (2006.01)
*G06F 9/50*          (2006.01)
(Continued)

(52) U.S. Cl.
CPC .......... *G06F 9/5072* (2013.01); *G06F 9/5027* (2013.01); *G06Q 20/065* (2013.01); *H04W 4/44* (2018.02); *G06F 2209/508* (2013.01)

(58) Field of Classification Search
CPC ....... H04W 4/44; G06F 9/5027; G06F 9/5072
(Continued)

(56) References Cited

U.S. PATENT DOCUMENTS 7,853,948 B2 * 12/2010 Berstis .................. G06F 9/5072
718/102
7,984,447 B1 *  7/2011 Markov .................. G06F 9/505
709/201
(Continued)

FOREIGN PATENT DOCUMENTS

JP        2001-325041 A    11/2001
JP        2020-160661 A    10/2020
(Continued)

OTHER PUBLICATIONS

Extended European search report issued on Oct. 9, 2024, in corresponding European patent Application No. 22864334.2, 10 pages.
(Continued)

*Primary Examiner* — Moustafa M Meky
(74) *Attorney, Agent, or Firm* — XSENSUS LLP

(57) ABSTRACT

A management device is used in a grid computing system, wherein a computational job constitutes a part of a project to be implemented by a client. The management device is configured to: store the content of the project, and a compensation rate set for the computational job of the project; acquire a computational amount of computational processing executed for the computational job by a computing device; calculate a first compensation value of a first compensation to be given to the user, according to the computational amount by the computing device; and acquire the degree of progress of the project, and when it is determined, based on the acquired degree of progress, that the project has
(Continued)

been completed, calculate a second compensation value of a second compensation to be given to the user, according to the compensation rate.

8 Claims, 11 Drawing Sheets

(51) Int. Cl.
*G06Q 20/06* (2012.01)
*H04W 4/44* (2018.01)

(58) Field of Classification Search
USPC .......................................................... 709/226
See application file for complete search history.

(56) References Cited

U.S. PATENT DOCUMENTS

| | | | | |
|---|---|---|---|---|
| 8,230,439 | B2* | 7/2012 | Amsterdam | G06F 9/5094 |
| | | | | 718/1 |
| 9,921,880 | B2* | 3/2018 | Michael | G06F 9/5033 |
| 9,961,017 | B2* | 5/2018 | Jacob | H04L 47/83 |
| 10,452,441 | B1* | 10/2019 | Subramanian | G06N 20/20 |
| 10,534,655 | B1* | 1/2020 | Kinney, Jr. | G06F 9/5083 |
| 10,972,479 | B2* | 4/2021 | Clark | H04L 9/50 |
| 11,010,201 | B2* | 5/2021 | Taniguchi | G06F 9/50 |
| 11,175,953 | B2* | 11/2021 | Subramanian | G06N 20/00 |
| 11,282,008 | B2* | 3/2022 | Arnott | G06Q 10/00 |
| 11,496,485 | B2* | 11/2022 | Clark | H04L 9/50 |
| 11,507,417 | B2* | 11/2022 | Kinney, Jr. | G06F 9/4881 |
| 11,693,702 | B2* | 7/2023 | Rosanova | G06F 9/5061 |
| | | | | 718/104 |
| 11,762,684 | B2* | 9/2023 | Yankelevich | G06Q 30/02 |
| | | | | 705/7.13 |
| 12,061,998 | B2* | 8/2024 | Arnott | G06Q 10/06313 |
| 2018/0349201 | A1 | 12/2018 | Clark | |
| 2020/0007464 | A1* | 1/2020 | Lo | H04L 9/0894 |
| 2020/0042361 | A1* | 2/2020 | Clark | H04L 9/3239 |
| 2020/0117508 | A1* | 4/2020 | Subramanian | G06Q 10/06313 |
| 2020/0151025 | A1* | 5/2020 | Kinney, Jr. | G06F 9/4881 |
| 2021/0055955 | A1* | 2/2021 | Yankelevich | G06Q 10/103 |
| 2021/0226961 | A1* | 7/2021 | Clark | H04L 63/12 |
| 2021/0311791 | A1* | 10/2021 | Rosanova | G06F 16/2458 |
| 2022/0164743 | A1* | 5/2022 | Arnott | G06Q 10/06316 |

FOREIGN PATENT DOCUMENTS

| | | |
|---|---|---|
| WO | 2018/226740 A2 | 12/2018 |
| WO | 2018/226740 A3 | 12/2018 |

OTHER PUBLICATIONS

International Search Report and Written Opinion mailed on Nov. 15, 2022, received for PCT Application PCT/JP2022/031693, filed on Aug. 23, 2022, 8 pages including English Translation.

* cited by examiner

| Rank | Title | Required Value Rst | Compensation Factor Ec |
|---|---|---|---|
| 1 | Diamond | 50,000 | 2.0 |
| 2 | Platinum | 30,000 | 1.5 |
| 3 | Silver | 10,000 | 1.3 |
| 4 | Bronze | 5,000 | 1.1 |
| 5 | White | 0 | 1.0 |

FIG.11A

| No. | Name | Registration Date | Scheduled Completion Date | Content | Project Progress (%) |
|---|---|---|---|---|---|
| 1 | ○○○○ | 2021/○○/○○ | 2022/○○/○○ | ............ | 20% |
| 2 | ○○○○ | 2021/○○/○○ | 2021/○○/○○ | ............ | 80% |
| 3 | ○○○○ | 2021/○○/○○ | 2021/○○/○○ | ............ | 50% |
| 4 | ○○○○ | 2021/○○/○○ | 2021/○○/○○ | ............ | 100% |
| 5 | ○○○○ | 2021/○○/○○ | 2022/○○/○○ | ............ | 20% |
| ... | ... | ... | ... | ... | ... |

FIG.11B

| No. | A (1-5) | B (1-5) | C (= A × B) | Computation Progress (%) | Status |
|---|---|---|---|---|---|
| 1 | 5 | 2 | 10 | 65% | Active |
| 2 | 2 | 1.5 | 3 | 55% | Active |
| 3 | 3 | 4 | 12 | 60% | Active |
| 4 | 1 | 2 | 2 | 100% | Complete |
| 5 | 2 | 2 | 4 | 20% | Active |
| ... | ... | ... | ... | ... | ... |

MANAGEMENT DEVICE AND MANAGEMENT METHOD

CROSS-REFERENCE TO RELATED APPLICATIONS

The present application is based on PCT/JP2022/031693, filed Aug. 23, 2022, which claims priority from Japanese Patent Application No. 2021-140684, filed Aug. 31, 2021. This application contains subject matter related to PCT/JP2022/031692 filed on Aug. 23, 2022 and corresponding U.S. patent application Ser. No. 18/684,848 entitled MANAGEMENT DEVICE AND MANAGEMENT METHOD, filed on the same day as this application, as well as PCT/JP2022/029660 filed on Aug. 2, 2022 and corresponding U.S. patent application Ser. No. 18/684,857 entitled GRID COMPUTING MANAGEMENT DEVICE AND MANAGEMENT METHOD, filed on the same day as this application. The entire disclosures of each are incorporated herein by reference.

TECHNICAL FIELD

The present invention relates to a management device and a management method, and more particularly to a management device and management method for managing grid computing.

BACKGROUND ART

Heretofore, there has been proposed a techniques of applying a plurality of vehicles to grid computing (see, for example, the following Patent Document 1). A system described in the Patent Document 1 comprises a management device connected to a communication network, and a plurality of in-vehicle devices each mounted on a respective one of a plurality of vehicles. In this system, the management device distributes a computational job to the in-vehicle devices via the communication network, and each of the in-vehicle devices can act as a computational resource to process the computational job.

There it has also been proposed that in such a grid computing system, the management device performs accounting processing (see, for example, the following Patent Document 2). In a system described in the Patent Document 2, a reward or compensation is paid to a provider of the computational resource according to a computational amount.

CITATION LIST

Patent Document

Patent Document 1: JP-A 2020-160661
Patent Document 2: JP-A 2001-325041

SUMMARY OF INVENTION

Technical Problem

In the system configured to perform an accounting process, as described in the Patent Document 2, a user who owns a computational resource (e.g. an in-vehicle device, or a personal computer) can provide computational power based on the computational resource with the aim of compensation. However, in such a system, a compensation is simply given to a user according a computational amount, but it is impossible to provide a user with sufficient motivation to positively participate in a business (project) to which a computational resource is to be provided.

The present invention has been made to solve the above technical problem, and an object thereof is to provide a management device and management method capable of providing motivation to a user to actively provide a computational resource in a grid computing system.

Solution to Technical Problem

In order to achieve the above object, the present invention provides a management device used in a grid computing system in which the management device causes a computing device of a user connected thereto via a communication network to computationally process a computational job selected by the user from among a plurality of computational jobs accepted from a client, wherein the computational job constitutes a part of a project to be implemented by the client, the management device being configured to: store a content of the project, and a compensation rate set for the computational job of the project; acquire a computational amount of computational processing executed for the computational job by the computing device; calculate a first compensation value of a first compensation to be given to the user, according to the computational amount by the computing device; and acquire a degree of progress of the project, and when it is determined, based on the acquired degree of progress, that the project has been completed, calculate a second compensation value of a second compensation to be given to the user, according to the compensation rate.

In the present invention having the above feature, when the user provides computational power of the computing device, the managing device calculates the first compensation value of the first compensation to be given to the user, according to a computational amount provided for the computing job. Further, when the project itself comprising the operation job has been completed, the management device calculates the second compensation value of the second compensation, according to the compensation rate set for the project. Thus, in the present invention, instead of simply providing the computational power of the computing device to the computational job, a user will consider selecting a computational job with reference to the content of a project and the compensation rate so as to most efficiently obtain the first compensation value and the second compensation value. In this manner, the present invention can provide motivation or a mechanism to actively provide a computational resource when a user provides the computational resource.

Preferably, in the present invention, the management device is configured to provide the content of the project and the compensation rate to the user via the communication network. According to this feature, the user can select a participating computational job by referring to the compensation rate of each computational job.

Preferably, in the present invention, the management device accepts, from the user via the communication network, a selection of a computational job to which computational processing of the computing device is to be provided, and causes the computing device to execute computational processing of the selected computational job. According to this feature, the management device can cause the user who submitted a participation application via the communication network to participate in the grid computing.

Preferably, in the present invention, the management device calculates the first compensation value according to the computational amount by the computing device, even if it is not determined that the project has been completed. According to this feature, the user can obtain the first compensation value for the provision of computational power by the computing device, irrespective of the completion of the project.

Preferably, in the present invention, the management device is configured to calculate the first compensation value to have a larger value as a cumulative value of the second compensation values which have been given to the user has a larger value. According to this feature, the user will try to select a computational job in consideration of the compensation rate of the computational job such that the cumulative value of the second compensation value efficiently increases so as to allow the first compensation value which can be obtained by the same computational amount to increase. Thus, in the present invention, it is possible to construct a mechanism in which, instead of simply selecting a computational job, a user actively makes a determination on a computational job, preferably, by referring to the compensation rate of the computational job and the content of a project, and becomes more likely to ferment awareness of social contribution to the provision of a computational resource.

Preferably, in the present invention, the management device calculates the second compensation value of the second compensation to be given to the user, according to a total computational amount of computational processing executed for the computational job by the computing device, and the compensation rate. According to this feature, the user can obtain more the second compensation value as the compensation rate has a larger value. More specifically, the management device may calculate the second compensation value by multiplying the total computational amount by the compensation rate.

In order to achieve the above object, the present invention also provides a management method used in a grid computing system in which a management device causes a computing device of a user connected thereto via a communication network to computationally process a computational job selected by the user from among a plurality of computational jobs accepted from a client, wherein the computational job constitutes a part of a project to be implemented by the client, the management method comprising: a step of storing, by the management device, a content of the project, and a compensation rate set for the computational job of the project; a step of acquiring, by the management device, a computational amount of computational processing executed for the computational job by the computing device; a first step of calculating, by the management device, a first compensation value of a first compensation to be given to the user, according to the computational amount by the computing device; and a second step of acquiring, by the management device, a degree of progress of the project, and when it is determined, based on the acquired degree of progress, that the project has been completed, calculating a second compensation value of a second compensation to be given to the user, according to the compensation rate.

Effect of Invention

The management apparatus and management method of the present invention make it possible to provide motivation to a user to actively provide a computational resource in a grid computing system.

BRIEF DESCRIPTION OF DRAWINGS

FIG. 11A is an explanatory diagram of a project list in the system according to the embodiment.
FIG. 11B is an explanatory diagram of a project list in the system according to the embodiment.

DESCRIPTION OF EMBODIMENTS

With reference to the drawings, one embodiment of the present invention will now be described. It should be noted that the same or equivalent elements or parts in the figures are assigned with the same reference sign, and duplicated description thereof will be omitted.

Figure 1:
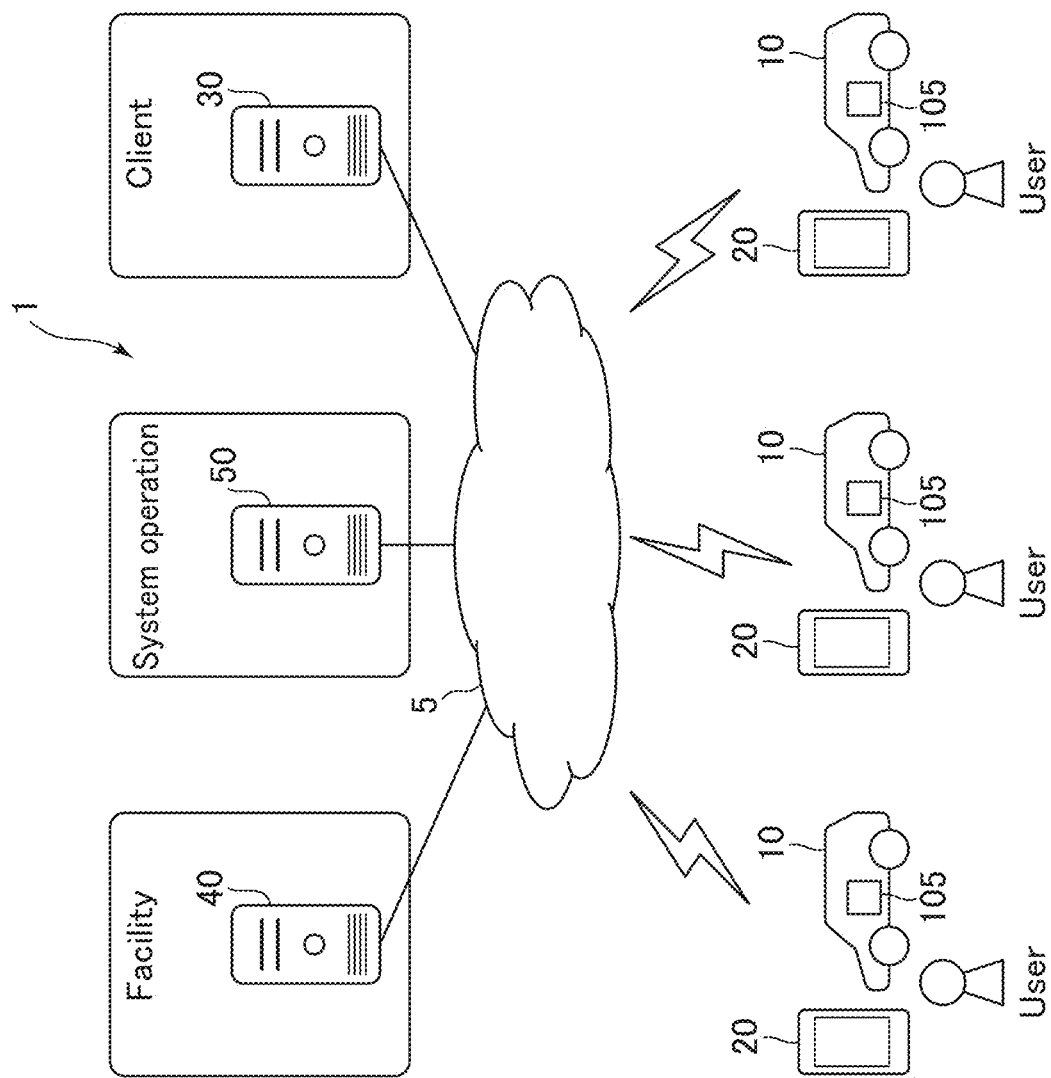
FIG. 1 is a configuration diagram of a system according to one embodiment of the present invention.

FIG. 1 is a configuration diagram of a system according to one embodiment of the present invention. The system 1 is a grid computing system which comprises a plurality of vehicles 10, a plurality of user terminals 20, one or more client servers 30, one or more facility servers 40, and a management server 50. These components are communicable with each other via a communication network 5. A plurality of computing devices 105 are mounted to the plurality of vehicles 10, respectively.

Figure 2:
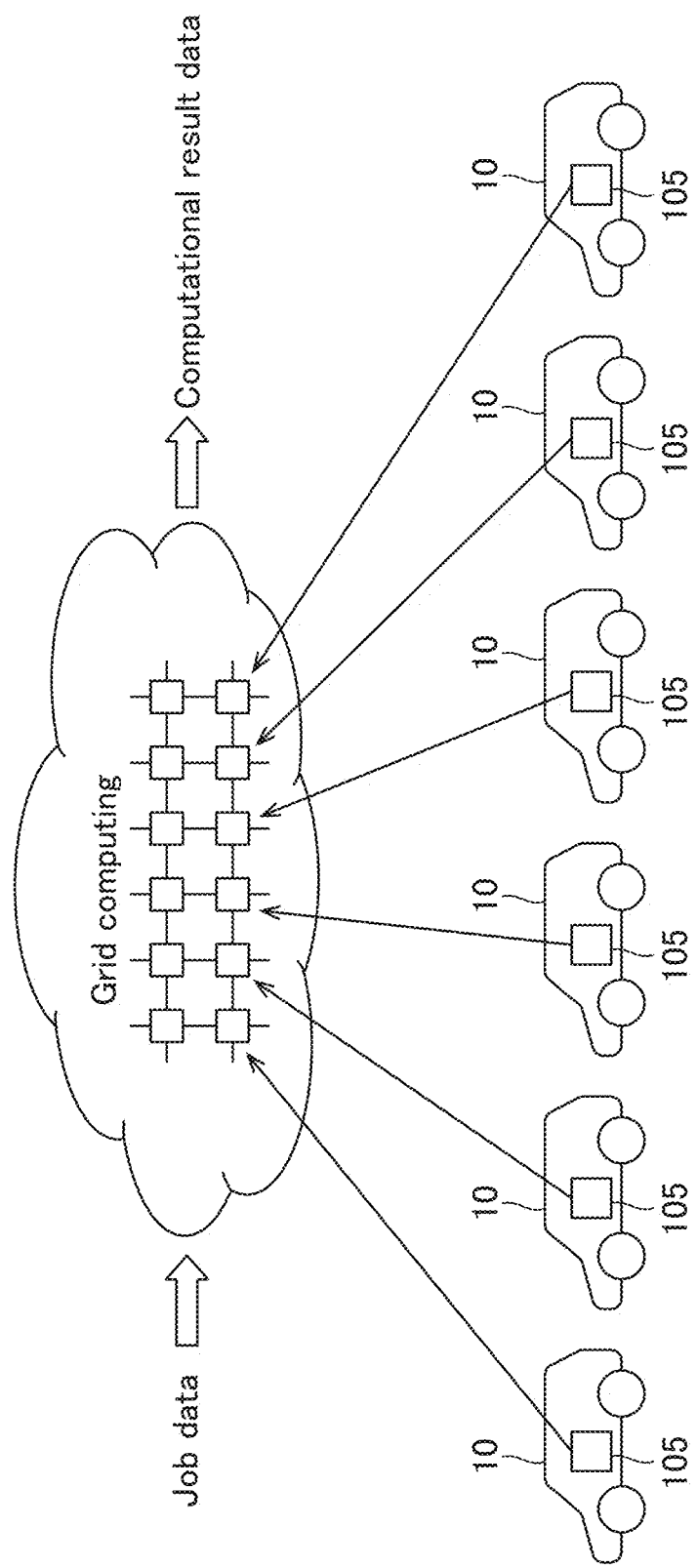
FIG. 2 is an explanatory diagram of grid computing in the system according to the embodiment.

FIG. 2 is an explanatory diagram of grid computing in the system according to this embodiment. As shown in FIG. 2, in this system 1, grid computing is constructed by the plurality of computing devices 105, to perform grid computing processing for causing usable computing devices 105 among the plurality of computing devices 105 to process job data (computational job).

When the computing power or computational power of the computing device 105 becomes necessary in the vehicle 10, the computing device 105 enters an operating state to use the computational power of the computing device 105. For example, when the vehicle 10 is traveling, the computational power of the computing device 105 becomes necessary for travel control of the vehicle 10, and thus the computing device 105 enters an operating state.

On the other hand, when the computational power of the computing device 105 becomes unnecessary in the vehicle 10, the computing device 105 enters a non-operating state, and thus the computational power of the computing device 105 becomes unused. For example, when the vehicle 10 is stopped and powered off, the computational power of the computing device 105 becomes unnecessary, and the computing device 105 enters a non-operating state. Thus, when the computational power of the computing device 105 is unnecessary in the vehicle 10, the computing device 105 can provide the computational power thereof to the grid computing processing, thereby effectively using the computational power (i.e., computational resource) of the computing device 105.

Figure 3:
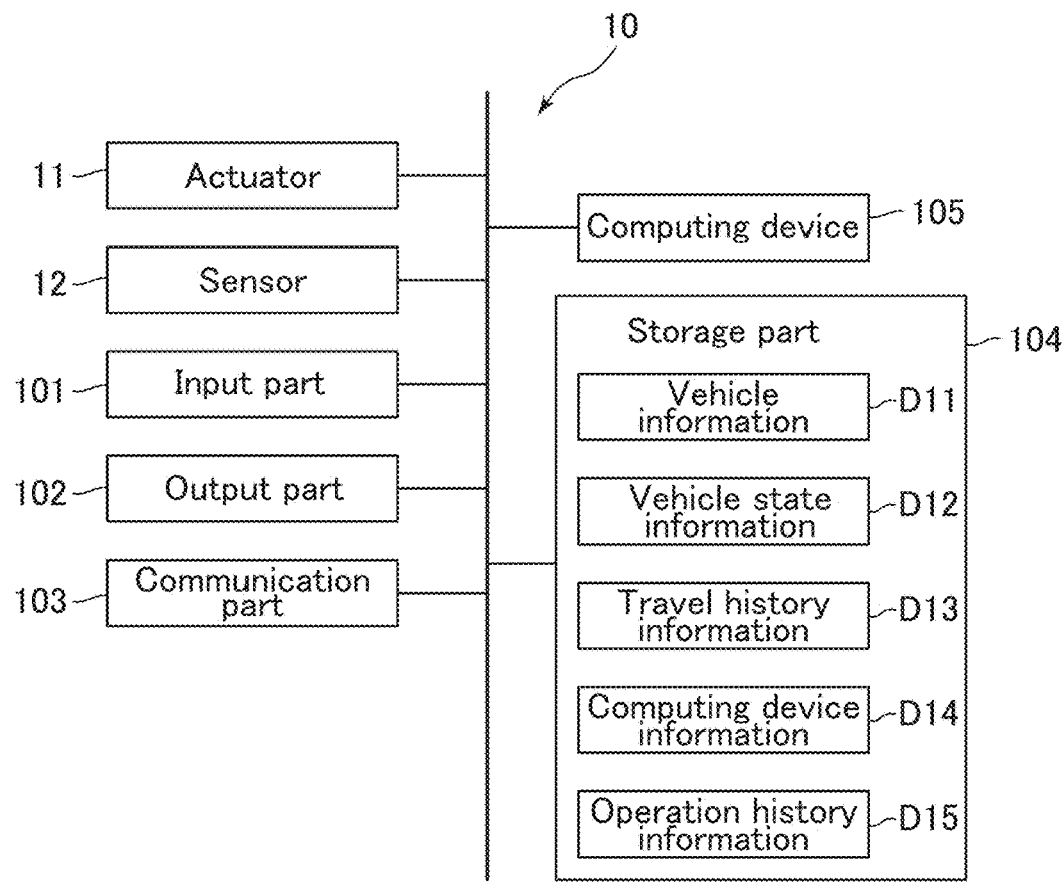
FIG. 3 is an explanatory diagram of a vehicle in the system of according to the embodiment.

FIG. 3 is an explanatory diagram of the vehicle in the system of according to this embodiment. The vehicle 10 is an automotive vehicle, such as an electric vehicle, or a plug-in hybrid vehicle, used by a user. A battery (illustration is omitted) is mounted on the vehicle 10, electric power of the battery is fed to an in-vehicle device such as the computing device 105. As shown in FIG. 3, the vehicle 10 comprises an actuator 11, a sensor 12, an input part 101, an output part 102, a communication part 103, a storage part 104, and the computing device 105.

The actuator 11 includes a drive-train actuator, a steering system actuator, and a braking system actuator. Examples of the drive-train actuator include an engine, a transmission, and a motor. Examples of the braking systems actuator include a braking device. Examples of the steering system actuator include a steering wheel.

The sensor 12 acquires various information used for control of the vehicle 10. Examples of the sensor 12 include a vehicle exterior camera for imaging the outside of the vehicle, a vehicle interior camera for imaging the inside of the vehicle, a radar for detecting objects outside the vehicle, a vehicle speed sensor, an acceleration sensor, a yaw rate sensor, an accelerator position sensor, a steering sensor, and a brake hydraulic pressure sensor.

The input part 101 is a device for inputting information or data. Examples of the input part 101 include: a manual operation part for, when operated, inputting information corresponding to the operation; a camera for inputting an image indicative of information; and a microphone for inputting voice indicative of information. Examples of the manual operation part include a manual operation button or a touch sensor of a car navigation device. The information or data input to the input part 101 are sent to the computing device 105.

The output part 102 is a device for outputting information or data. Examples of the output part 102 include a display part for outputting an image indicative of information, and a speaker for outputting audio indicative of information. Examples of the display part include a display of a car navigation device. Examples of the speaker include a speaker of a car navigation device.

The communication part 103 is a device for transmitting and receiving information or data. The information or data received by the communication part 103 are sent to the computing device 105. The storage part 104 is a storage device for storing information or data. The storage part 104 may be provided in the computing device 105.

The computing device 105 is a device for controlling each component of the vehicle 10. In this embodiment, the computing device 105 controls the actuator 11 according to various information obtained by the sensor 12. The computing device 105 is a computer device comprising a processor, and a memory. Examples of the processor include a central processing unit (CPU), a graphics processing unit (GPU), and a media processing unit (MPU). In this embodiment, the processor comprises a CPU and a GPU. The memory stores a program for operating the processor, information or data indicative of processing results of the processor, etc.

It should be noted that the number of processors to be mounted on the computing device 105 may be one or may be two or more. A processor to be mounted on the computing device 105 may comprise one or more of a CPU and a GPU and a GPU. For example, the computing device 105 may be composed of one or more electric control units (ECUs).

In this embodiment, the storage part 104 stores vehicle information D11, vehicle state information D12, travel history information D13, computing device information D14, and operation history information D15.

The vehicle information D11 is information about the vehicle 10. For example, the vehicle information D11 includes a vehicle ID set for the vehicle 10, and vehicle performance information indicative of performance of the vehicle. The vehicle ID is one example of vehicle identification information which identifies the vehicle 10. A user ID is one example of user identification information which identifies the user.

The vehicle state information D12 indicates the state of the vehicle 10. Examples of the vehicle state information D12 include vehicle location information, vehicle communication information, vehicle power supply information, vehicle battery remaining amount information, and vehicle charging information. The vehicle location information indicates the location (latitude and longitude) of the vehicle 10. For example, the vehicle location information can be obtained by a global positioning system (GPS). The vehicle communication information indicates a communication state of the vehicle 10. The vehicle power supply information indicates the state of a power supply of the vehicle 10. For example, the vehicle power supply information indicates on/off of an ignition power supply, on/off of an accessory power supply, etc. The vehicle battery remaining amount information indicates a remaining amount of the battery (illustration is omitted) mounted on the vehicle 10. The vehicle charging information indicates whether or not the vehicle 10 is charging in the charging facility (illustration is omitted).

The travel history information D13 is information indicative of a travel history of the vehicle 10. For example, the travel history information D13 indicates the location of the vehicle 10 and time in association with each other.

The computing device information D14 is information about the computing device 105. Examples of the computing device information D14 include: a computing device ID set for the computing device 105; a vehicle ID set for the vehicle 10 on which the computing device 105 is mounted; and computing device performance information indicative of performance of the computing device 105. The computing device ID is one example of computing device identification information which identifies the computing device 105. The performance of the computing device 105 to be indicated by the computing device performance information includes a computational power indicative of the computational power (specifically, maximum computational power) of the computing device 105, and the ratio between the CPU and the GPU in the computing device 105. The computational power of the computing device 105 means the amount of data or the number of computational processings (computational amount) which can be computed per unit time by the computing device 105.

The operation history information D15 is information indicative of an operation history of the computing device 105. For example, the operation history information D15 indicates a usage rate of the computational power of the computing device 105 and time in association with each other.

Figure 4:
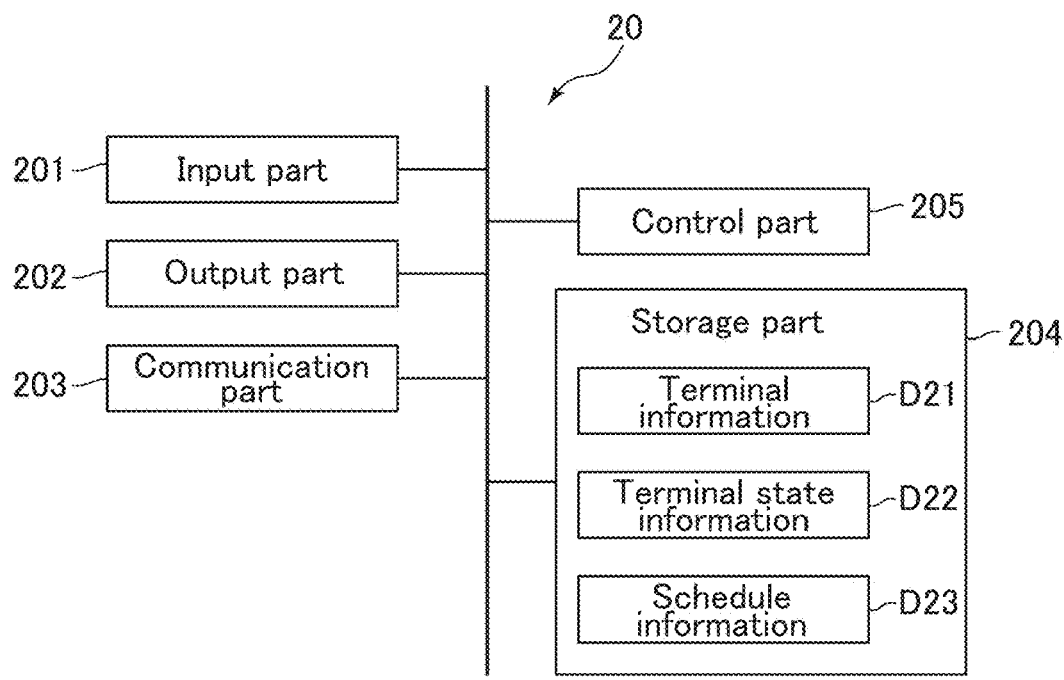
FIG. 4 is an explanatory diagram of a user terminal in the system according to the embodiment.

FIG. 4 is an explanatory diagram of the user terminal in the system according to this embodiment. The user terminal 20 is an information terminal device (computer device) used by a user, and is, for example, a smartphone, a tablet, or a notebook personal computer. The user terminal 20 is preferably a portable device. As shown in FIG. 4, the user terminal 20 comprises an input part 201, an output part 202, a communication part 203, a storage part 204, and a control part 205.

The input part 201 is a component for inputting information or data. Examples of the input part 201 include: a manual operation part for, when operated, inputting information corresponding to the operation; a camera for inputting an image indicating information, and a microphone for inputting voice indicating information. Examples of the manual operation part include a manual operation button, and a touch sensor. The information input to the input part 101 is sent to the computing device 105.

The output part 202 is a component for outputting information or data. Examples of the output part 202 include a display part for outputting an image indicating information, and a speaker for outputting audio indicating information.

The communication part 203 is a component for transmitting and receiving information or data. The information or data received by the communication part 303 is sent to the control part 205. The storage part 204 is a storage device for storing information or data.

The control part 205 is a component for controlling each section of the user terminal 20. The control part 205 comprises a processor, and a memory. The memory stores a program for operating the processor, information or data indicating processing results of the processor, etc.

In this embodiment, the storage part 204 stores terminal information D21, terminal state information D22, and schedule information D23.

The terminal information D21 is information about the user terminal 20. Examples of the terminal information D21 include a user terminal ID set for the user terminal 20, and user terminal performance information indicative of performance of the user terminal 20. The user terminal ID is one example of user terminal identification information which identifies the user terminal 20.

The terminal state information D22 is information indicative of the state of the user terminal 20. The terminal state information D22 includes user terminal location information indicative of the location of the user terminal 20, and user terminal communication state information indicative of the communication state of the user terminal 20.

The schedule information D23 indicates an action history and action schedule of the user owning the user terminal 20. For example, the schedule information D23 indicates the location of the user and a stay period (or scheduled stay period) in association with each other. The schedule information D23 can be acquired by a scheduling function incorporated in the user terminal 20. Specifically, the user can input his/her action history and action schedule to the user terminal 20 using the scheduling function so as to provide the schedule information D23 indicative of the action history and action schedule of the user.

Figure 5:
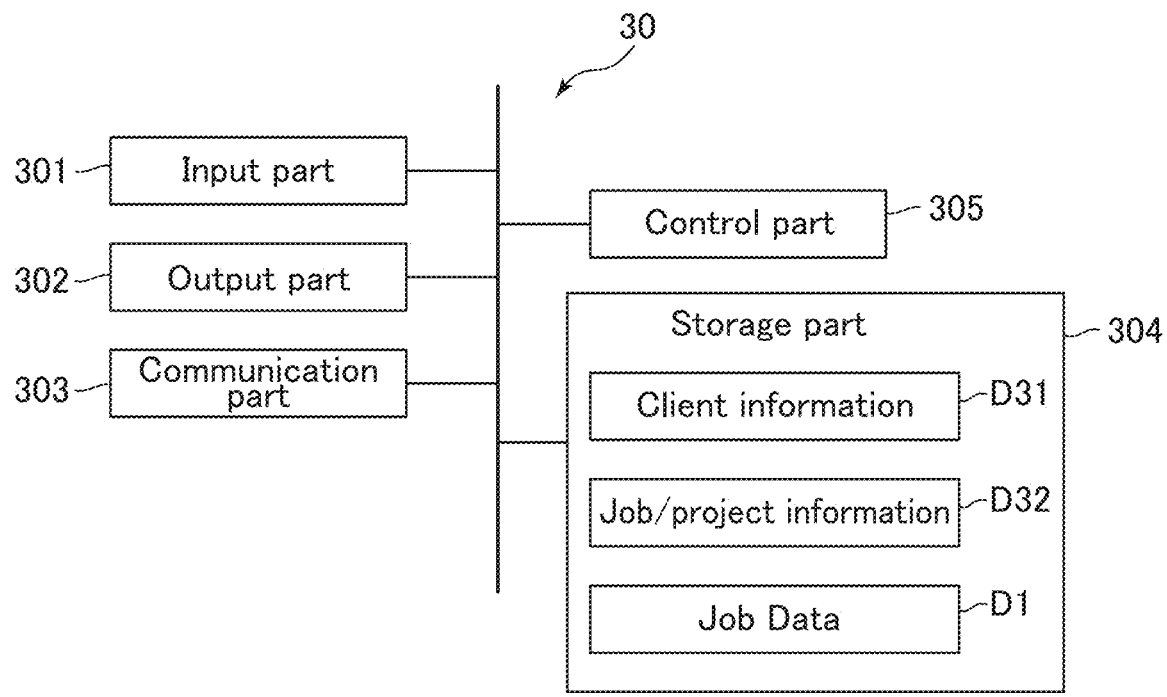
FIG. 5 is an explanatory diagram of a client server in the system according to the embodiment.

FIG. 5 is an explanatory diagram of the client server in the system according to this embodiment. The client server 30 is a server device or computer device used by a client. For example, the client is a business entity, such as a company, research institution, or educational institution, and performs a project or task. The project includes computational processing such as computer simulation, and various other tasks such as funding, securing of human resources, and negotiation with external institutions. Among them, the client requests the management server 50 for computation of job data or computational job necessary for implementation of the project. As shown in FIG. 5, the client server 30 comprises an input part 301, an output part 302, a communication part 303, a storage part 304, and a control part 305.

The input part 301 is a device for inputting information or data. Examples of the input part 301 include: a manual operation part for, when operated, inputting information corresponding to the operation; a camera for inputting an image indicative of information; and a microphone for inputting voice indicative of information. Examples of the manual operation part include a manual operation button, a touch sensor, a keyboard, and a mouse. The information or data input to the input part 301 are sent to the control part 305.

The output part 302 is a device for outputting information or data. Examples of the output part 302 include a display part for outputting an image indicating information, and a speaker for outputting audio indicating information. The communication part 303 is a device for transmitting and receiving information or data. The information or data received by the communication part 303 is sent to the control part 305. The storage part 304 is a storage device for storing information or data.

The control part 305 is a device for controlling each section of the client server 30. The control part 305 comprises a processor, and a memory. The memory stores a program for operating the processor, and information or data indicating processing results of the processor.

In this embodiment, the storage part 304 stores client information D31, job/project information D32, and job data D1.

The client information D31 is information about the client. The client information D31 includes a client ID set for the client, a client server ID set for the client server 30 owned by the client, and the person-in-charge name, address and telephone number of the client. The client ID is one example of client identification information which identifies the client. The client server ID is one example of client server identification information which identifies the client server 30.

The job/project information D32 includes project information about a business or project to be implemented by the client, and job information about a computational job to be performed for the project. The project information includes the name of the project, the content of the project, a scheduled completion date of the project, and the degree (%) of progress of the project. The job information includes a computation type of the computational job, a processing condition, a required computational power, and job delivery date information indicating a delivery date of the computational job, etc.

The Job data D1 is computational processing data (computational job) necessary to complete the project. The computational job is computational processing constituting a part of the project, and may be, for example, simulation computation. The job data D1 can be classified by computation types. Examples of the computation types include a CPU-based computation type, and a GPU-based computation type. In the CPU-based computation-type job data D1, complicated computation having many conditional branches, such as simulation computations, tends to be required. In the GPU-based computation-type job data D1, a vast amount of simple computations, such as image processing and machine learning, tend to be required. The job data D1 can also be classified by processing conditions. Examples of the processing conditions include a processing condition requiring constant or continuous communication, and a processing condition which does not require constant or continuous communication.

Figure 6:
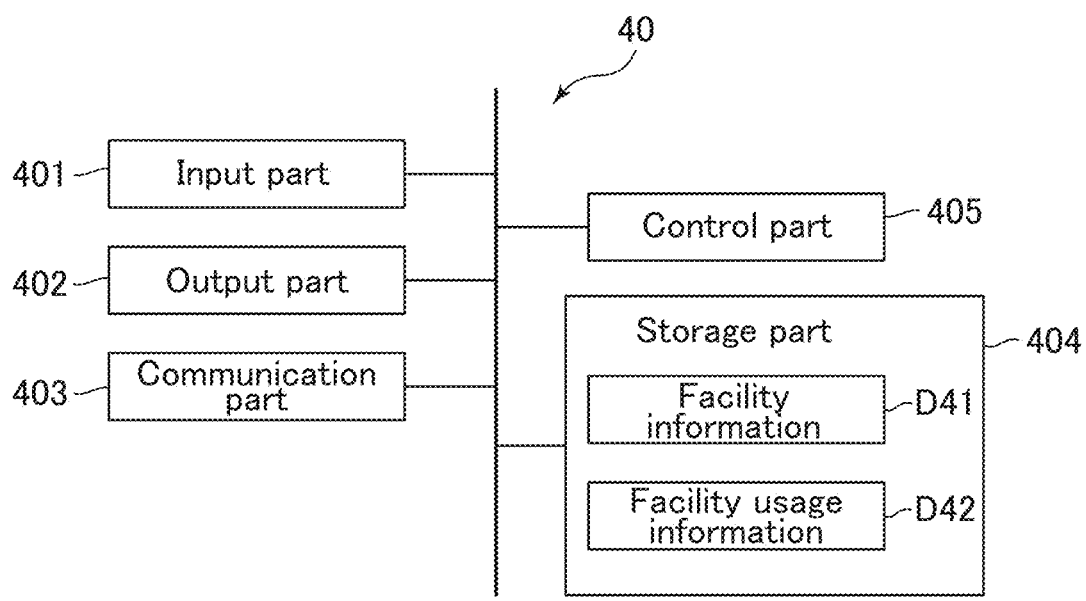
FIG. 6 is an explanatory diagram of a facility server in the system according to the embodiment.

FIG. 6 is an explanatory diagram of the facility server in the system according to this embodiment. The facility server 40 is a server device or computer device used in a facility visited by a user. The user may make a reservation for visit to the facility. Examples of the facility include an athletic field, a theater, a supermarket, a restaurant, a lodging facility, and a mart or store.

As shown in FIG. 6, the facility server 40 includes an input part 401, an output part 402, a communication part 403, a storage part 404, and a control part 405. The configurations of the input part 401, the output part 402, the communication part 403, the storage part 404 and the control part 405 of the facility server 40 are similar to those of the input part 301, the output part 302, the communication part 303, the storage part 304 and the control part 305 of the client server 30, respectively.

In this embodiment, the storage part 404 stores facility information D41 and facility usage information D42. The facility information D41 is information about the facility. The facility information D41 includes: a facility ID set for the facility; a facility server ID set for the facility server 40 owned by the facility; facility location information indicative of the location (latitude and longitude) of the facility; and the person-in-charge name, address and telephone number of the facility. The facility ID is one example of facility identification information which identifies the facility. The facility server ID is one example of facility server identification information which identifies the facility server 40.

The facility usage information D42 indicates a usage status (usage history and usage schedule) of the facility. Specifically, the facility usage information D42 indicates a user who visits the facility and a stay period (or scheduled stay period) in association with each other.

Figure 7:
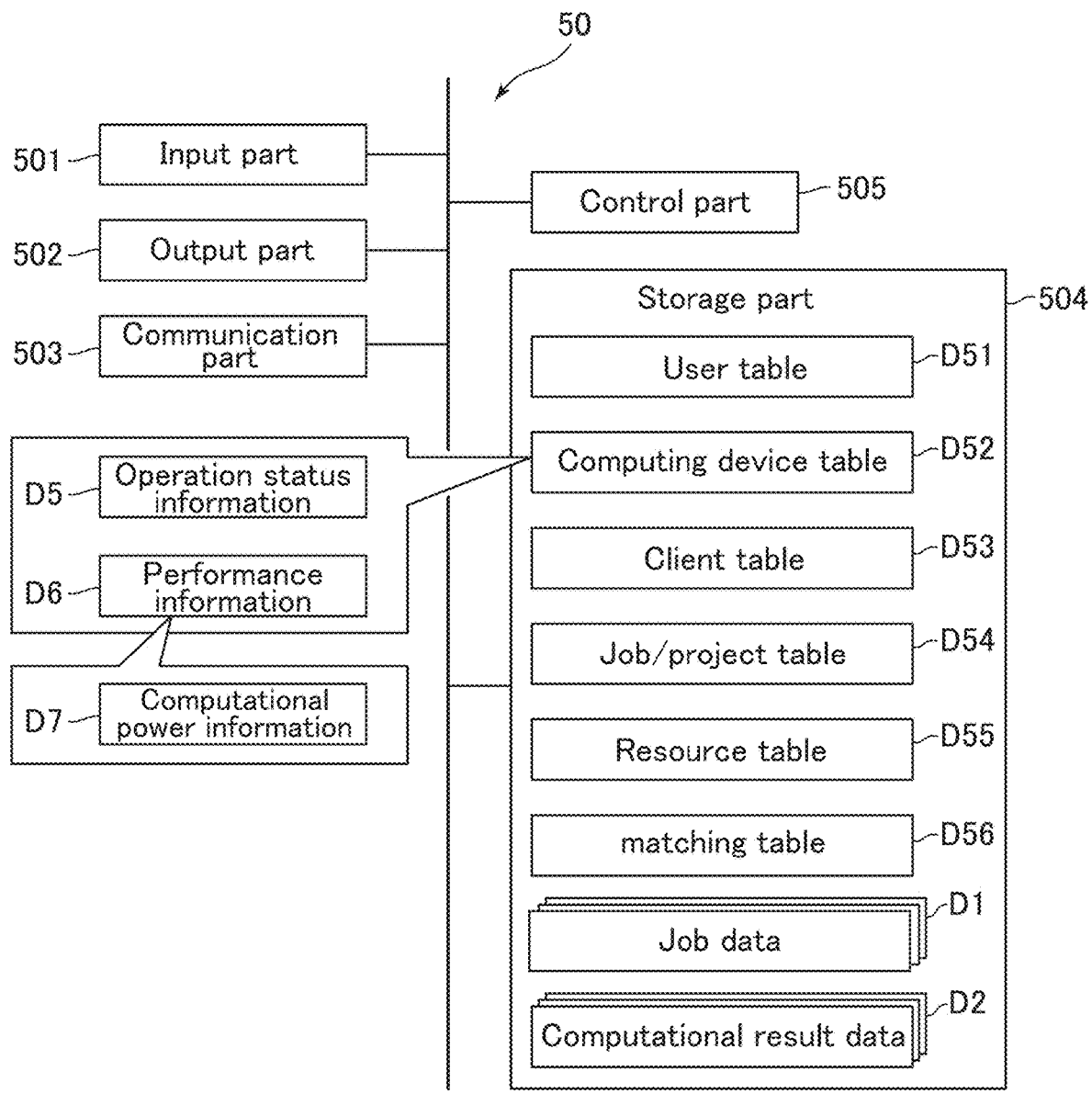
FIG. 7 is an explanatory diagram of a management server in the system according to the embodiment.

FIG. 7 is an explanatory diagram of the management server in the system according to this embodiment. The management server 50 (or management device 50) is a server device or computer device for managing the operation of the system 1 which executes the grid computing. As shown in FIG. 7, the management server 50 comprises an input part 501, an output part 502, a communication part 503, a storage part 504, and a control part 505. The configurations of the input part 501, the output part 502, the communication part 503, the storage part 504 and the control part 505 of the management server 50 are similar to those of the input part 301, the output part 302, the communication part 303, the storage part 304 and the control part 305 of the client server 30, respectively.

In this embodiment, the storage part 504 stores a user table D51, a computing device table D52, a client table D 53, a job/project table D54, a resource table D55, a matching table D56, the job data D1, and computational result data D2.

The user table D51 is a table for managing a plurality of users. The user table D51 is configured to, with respect to each user, register therein the user ID set for the user, the vehicle ID set for a vehicle 10 owned by the user, the computing device ID set for a computing device 105 owned by the user, the user terminal ID set for a user terminal 20 owned by the user, etc.

The computing device table D52 is a table for managing a plurality of computing devices 105. The computing device table D52 is configured to, with respect to each computing device 105, register therein the computing device ID set for the computing device 105, the user ID set for a user owning the computing device 105, the vehicle ID set for a vehicle 10 on which the computing device 105 is mounted, etc.

Further, with respect to each computing device 105, the computing device table D52 resisters therein performance (computational power, ratio between CPU and GPU, etc.) of the computing device 105, an operation status (operation history and operation schedule) of the computing device 105, etc. In other words, the computing device table D52 includes: operation status information D5 indicative of the operation status in each of the plurality of computing devices 105; and performance information D6 indicative of performance of each of the plurality of computing devices 105. The performance information D6 includes computational power information D7 indicative of computational power of each of the plurality of computing devices 105.

The client table D53 is a table for managing a plurality of clients. The client table D53 is configured to, with respect to each client, register therein the client ID set for the client, the client server ID set for a client server 30 owned by the client, the person-in-charge name, address and telephone number of the client, etc.

The job/project table D54 is a table for managing jobs and projects requested from one or more clients. With respect to each job, the job/project table D54 includes an acceptance number set for the job, a registration date when the request of the job is accepted, the client ID set to the client who requested the job, the job information of the job, the project information of the project including the job, and project evaluation information.

The job information includes the computation type of the computational job, the processing condition, the required computational power, the job delivery date information indicating the delivery date of the computational job, an estimated total computational amount, an executed computational amount, and the degree (%) of progress of the job. The degree of progress of the job is the rate (percentage) of the executed computational amount to the estimated total computational amount of the computational job. The management server 50 preliminarily computes and stores the total computational amount of the computational job, and updates the degree of progress of the job along with execution of the computational processing of the computational job by the computing devices 105.

The project information includes the name of the project, the content of the project, the scheduled completion date of the project, and the degree (%) of progress of the project. The project information is information obtained from each client. The degree of progress of the project is the value of the degree of progress of the project self-evaluated by the client. The management server 50 updates the degree of progress of the project based on data received from the client server 30 at a predetermined time or periodically.

Further, an operator of the management server 50 evaluates the project based on the project information acquired from the client to create the project evaluation information, and inputs it to the management server 50. This processing is performed when accepting a request for computational processing of a computational job from the client. That is, the operator estimates the degree of social influence (A) and the degree of achievement difficulty (B) of the project, and generates an evaluation value or evaluation factor (C) based on them (see FIG. 11B).

In this embodiment, the evaluation value C is a numerical index representing the value of the project. As the evaluation value C increases beyond 1, the project is evaluated to have greater value. The evaluation value C is a numerical value used as a multiple when calculating a second compensation value Rs of the after-mentioned second compensation ES. That is, the evaluation value C is a compensation rate for the after-mentioned second compensation ES on which the value of the project is reflected In this embodiment, each of the degree of social influence A and the degree of achievement difficulty B of the project is evaluated on plural levels of 1 (low) to 5 (high), and a product of the resulting evaluated levels is set as the evaluation value C (C=A×B). Alternatively, indices such as the degree of social influence, the degree of achievement difficulty, and the degree of social contribution may be set, and then one or more of them may be combined (product or sum) to set the evaluation value. It should be noted that, instead of creating the project evaluation information by the operator, the management server 50 may learn and analyze the project information using machine learning to create the project evaluation information.

The project evaluation information also includes status information ("active (ongoing)", "complete", etc.) indicative of a progress status of the project. When the management server 50 determines that the project has been completed, the management server 50 updates the status information from "active" to "complete". Specifically, the management server 50 periodically determines whether or not the entire computational processing of the computational job had been completed, i.e., the degree of progress of the job becomes 100%, and the degree of progress of the project becomes 100%, and determines, when these conditions are satisfied, that the project has been completed. It should be noted that, instead of performing the above determination by the management server 50, the operator may update the status information based on the degree of progress of the computational job and the degree of progress of the project.

The resource table D55 is a table for managing the computational power in the grid computing processing. Specifically, the resource table D55 is a table for managing the results of the after-mentioned prediction processing. With respect to each computing device 105, the resource table D55 registers therein the computing device ID set for the computing device 105, a prediction result of a temporal change in the computational power of the computing device 105 usable during the grid computing processing, etc.

The matching table D56 is a table for managing the results of the after-mentioned matching processing. With respect to each job, the matching table D56 registers therein an acceptance number set for the job, job data corresponding to the job, the computing device ID set in the computing device 105 assigned to the job data by the after-mentioned matching processing, etc.

The job data D1 stored in the storage part 504 is the job data D1 accepted by the after-mentioned job acceptance processing.

The computational result data D2 stored in the storage part 504 is job data computed by the after-mentioned grid computing processing, and indicates the result of the computation.

Next, update of the user table D51 will be described. The user table D51 is updated by the control part 505 of the management server 50. For example, when a new user participates in the system 1, the control part 505 updates the user table D51 by registering information regarding the new user in the user table D51.

Specifically, the control part 505 newly sets the user ID to the new user, and registers the "user ID" set for the new user, the "vehicle ID" set in a vehicle 10 owned by the new user, the "computing device ID" set for a computing device 105 mounted on the vehicle 10, and the "user terminal ID" set for a user terminal 20 owned by the new user, in the user table D51 in association with each other.

The "vehicle ID" and the "computing device ID" associated with the new user can be obtained through communication between the vehicle 10 owned by the new user and the management server 50. The "user terminal ID" associated with the new user can also be obtained through communication between the user terminal 20 owned by the new user and the management server 50.

Next, update of the computing device table D52 will be described. The computing device table D52 is updated by the control part 505 of the management server 50. For example, when a new computing device 105 participates in the system 1, the control part 505 updates the computing device table D52 by registering information regarding the new computing device 105 in the computing device table D52.

Specifically, the control part 505 registers the "computing device ID" set for the new computing device 105, the "user ID" set for a user owning the new computing device 105, the "vehicle ID" set for a vehicle 10 on which the new computing device 105 is mounted, and the "performance" and "operation status" of the new computing device 105, in the computing device table D52 in association with each other.

The "computing device ID", "vehicle ID", "performance" and "operation status" associated with the new computing device 105 can be obtained through communication between the vehicle 10 on which the new computing device 105 is mounted and the management server 50. The "user ID" associated with the new computing device 105 can also be obtained by referring to the user table D51.

The "operation status" of each computing device 105 registered in the computing device table D52 is periodically updated. In other words, the operation status information D5 included in the computing device table D52 are periodically updated. This periodic update is performed by the control part 505 of the management server 50.

<First Update Processing> For example, the "operation status" (i.e., operation status information D5) of the computing device 105 in the computing device table D52 may be periodically updated based on the "operation history information D15" of the vehicle 10. Specifically, the control part 505 may execute the following first update processing with respect to each computing device 105 registered in the computing device table D52.

In first update processing, the control part 505 requests the vehicle 10 on which the computing device 105 is mounted, for access to the "operation history information D15". In response to the request, the computing device 105 of the vehicle 10 permits access to the "operation history information D15". Based on the operation history of the computing device 105 shown in the operation history information D15, the control part 505 updates the "operation history" which is a past operation status as a part of the "operation status" of the computing device 105, registered in the computing device table D52.

<Second Update Process> The "operation status" (i.e., operation status information D5) of the computing device 105 in the computing device table D52 may be periodically updated based on the "travel history information D13" of the vehicle 10. Specifically, the control part 505 may execute the following second update processing with respect to each computing devices 105 registered in the computing device table D52.

In second update processing, the control part 505 requests the vehicle 10 on which the computing device 105 is mounted, for access to the "travel history information D13". In response to the request, the computing device 105 of the vehicle 10 permits access to the "travel history information D13". Based on the travel history of the vehicle 10 shown in the travel history information D13, the control part 505 estimates the operation history of the computing device 105. Then, based on the estimated operation history of the computing device 105, the control part 505 updates the "operation history" which is a past operation status as a part of the "operation status" of the computing device 105 registered in the computing device table D52.

<Third Update Process> The "operation status" (i.e. operation status information D5) of the computing device 105 in the computing device table D52 may be periodically updated based on the "schedule information D23" of the user terminal 20. Specifically, the control part 505 may execute the following third update processing with respect to each computing devices 105 registered in the computing device table D52.

In third update processing, the control part 505 requests the user terminal 20 owned by a user owning the computing device 105, for access to the "schedule information D23". In response to the request, the control part 205 of the user terminal 20 permits access to the "schedule information D23". The control part 505 detects an action status related to the vehicle 10 on which the computing device 105 is mounted, from among action statuses (action histories and action schedules) of the user shown in the schedule information D23.

For example, an action history indicating that the user rode in the vehicle 10 is detected from among action histories which are past action statuses as a part of the action statuses of the user, and an action schedule indicating that the user is scheduled to ride in the vehicle 10 is detected from among action schedules which are future action statuses as the remaining part of the action statuses of the user.

Subsequently, the control part 505 estimates a travel status (travel history and travel schedule) of the vehicle 10 based on the detected action status of the user. Then, based on the estimated travel status of the vehicle 10, the control part 505 estimates the operation status (operation history and operation schedule) of the computing device 105. Then, based on the estimated operation status of the computing device 105, the control part 505 updates the "operation status" of the computing device 105 registered in the computing device table D52.

<Fourth Update Processing> The "operation status" (i.e., operation status information D5) of the computing device 105 in the computing device table D52 may be periodically updated based on the "facility usage information D42" of the facility server 40. Specifically, the control part 505 may execute the following fourth update processing with respect to each computing device 105 registered in the computing device table D52.

In the fourth update processing, the control part 505 requests the facility server 40 for access to the "facility usage information D42". In response to this request, the facility server 40 permits access to the "facility usage information D42". The control part 505 detects a usage status related to the vehicle 10 on which the computing device 105 is mounted, from among usage statuses (usage histories and usage schedules) of the facility indicated in the facility usage information D42.

For example, a usage history indicating that a user rode in the vehicle 10 is detected from among usage histories which are past usage statuses as a part of the usage statuses of the facility, and a usage schedule indicating that the user is scheduled to ride in the vehicle 10 is detected from among usage schedules which are future usage statuses as the remaining part of the usage statuses of the facility.

Subsequently, the control part 505 estimates the travel status (travel history and travel schedule) of the vehicle 10 based on the detected usage status of the facility. Then, the control part 505 estimates the operation status (operation history and operation schedule) of the computing device 105 based on the estimated travel status of the vehicle 10. Then, the control part 505 updates the "operation status" of the computing device 105 registered in the computing device table D52 based on the estimated operation status of the computing device 105.

Next, update of client table D53 will be described. The client table D53 is updated by the control part 505 of the management server 50. For example, when a new client participates in the system 1, the control part 505 updates the client table D53 by registering information regarding the new client in the client table D53.

Specifically, the control part 505 newly sets the client ID for the new client, and registers the "client ID" set for the new client, the "client server ID" set for a client server 30 owned by the new client, the "person-in-charge name", "address" "telephone number" of the new client in the client table D53, in association with each other. The "client server ID", "person-in-charge name", "address" and "telephone number" of the new client can be obtained through communication between the client server 30 and the management server 50.

Figures 8, 9:
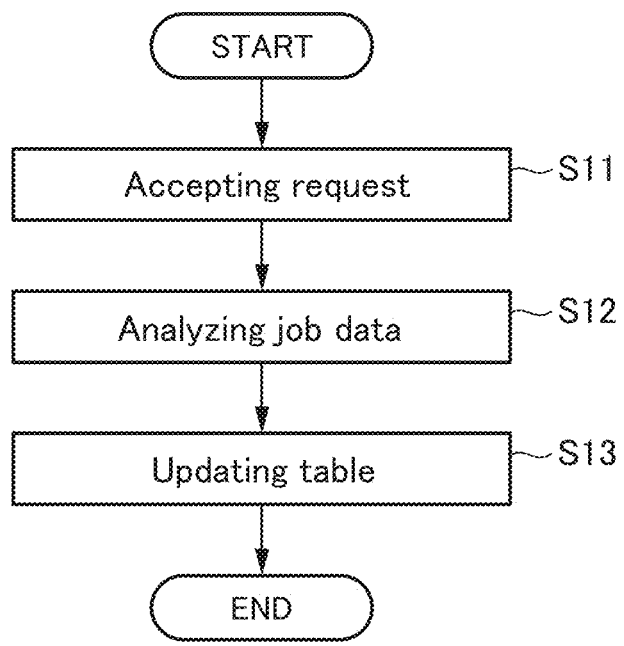
FIG. 8 is a graph illustrating the relationship between a user rank and a compensation factor in the system according to the embodiment.
FIG. 9 is a processing flow of job acceptance processing in the system according to the embodiment.

Next, with reference to FIG. 8, a compensation to be given to a user will be described based on this embodiment. FIG. 8 is a graph illustrating the relationship between a user rank and a compensation factor. In this embodiment, a user can obtain a compensation from the operator of the system 1 in exchange for provision of computational processing power (computational resource) by the computing device 105. The compensation in this embodiment comprises a first compensation EP and a second compensation ES. The first compensation EP and the second compensation ES are registered in the user table D51 as compensation information for each user.

The first compensation EP is a compensation having an economic value and is convertible to a currency value by a predetermined conversion factor. For example, the first compensation EP is a point usable in the system 1, a virtual currency (cryptocurrency), a discount privilege of goods, or the like. The first compensation value Rp of the first compensation EP is calculated based on a computational amount Q executed in computational processing of a computational job by the computing device 105.

The management server 50 divides the computational job into a plurality of computational blocks, and the computing device 105 calculates some of the divided computational blocks. For example, one computational block is set as one computational unit, and the first compensation value Rp of the first compensation EP is calculated by multiplying the number of the computational units (computational amount Q) executed by the computing device 105 by a compensation factor Ec (i.e., Rp=Q×Ec). Thus, a user obtains the first compensation EP, depending simply on the provided computational amount Q (i.e. the number of computational unit), regardless of the content of a project and without other restrictions.

However, in this embodiment, as shown in FIG. 8, the compensation factor Ec (Ec≥1) is set according to a user rank acquired by the user. Thus, the user can obtain more the first compensation EP by obtaining a high user rank. For example, when the user has a user rank 3 (silver rank), the compensation coefficient Ec of the user is 1.3 times. Thus, the first compensation value Rp of the first compensation EP of this user is calculated as Q×1.3 (Ec). That is, the first compensation value Rp is a sum of a basis compensation value Rb (Rb=Q×1.0) which is a compensation value when Ec is 1.0, and an additional compensation value Ra (Ra=Q× 0.3) equal to 0.3 times the basic compensation value (i.e., Rp=Rb+Ra).

On the other hand, the second compensation ES is set such that the second compensation value Rs thereof varies depending on the content of a project and other conditions. Further, the second compensation ES is an honorary compensation to be given to the user when the project is completed and useful for the society. Therefore, differently from the first compensation EP, the second compensation ES has no economic value, and is inconvertible to a currency value. In this embodiment, the second compensation ES is used to determine the user rank.

As shown in FIG. 8, the user rank is set by a cumulative value Rst of the second compensation values Rs of the second compensation ES. That is, as the user acquires more the second compensation ES, the user rank becomes higher, and the compensation factor Ec is set to a larger value, so that the user can obtain more the first compensation EP. For example, a user whose cumulative value Rst of the second compensation value Rs of the second compensation ES has already exceeded 10,000 is set to the user rank 3 (Ec=1.3). The management server 50 may be configured to reset the accumulated value Rst to zero, every predetermined period (time period) (e.g. one year).

The second compensation value Rs of the second compensation ES is calculated by multiplying the evaluation value C, i.e., a compensation rate of the project, by the total value QT of the computational amounts Q provided by the user (i.e., Rs=QT×C). The evaluation value C is set to a large value as the degree of social influence A of the project is large and the degree of achievement difficulty B is higher. Thus, when the user selects a project having a large evaluation value C, it may be possible to obtain more the second compensation ES.

However, the second compensation ES is given when the project has been completed (i.e. when the status information is updated to "completed"), as described above. That is, the user can obtain the second compensation ES when the project has been successfully completed, but cannot obtain the second compensation ES if the project has failed and has been ceased. As the evaluation value C has a larger value, the possibility that the project will be incomplete becomes higher. Therefore, the user will try to refer to the content of the project, the degree of progress of the project, etc., in addition to the project evaluation information, to make a selection to meaningfully use the limited computational resource of the user in a social and economical sense.

The control part 505 of the management server 50 registers the calculated first compensation value Rp of the first compensation EP and the calculated second compensation value Rs of the second compensation ES in a user account in the user table D51 in association with the user ID. The user rank and the compensation factor Ec are set to the user table D51 according to the cumulative value Rst of the second compensation values Rs of the second compensation ES registered in the user table D51. Further, the control part 505 may transfer an equivalent amount of the first compensation value Rp of the first compensation EP to a bank account of the user. Alternatively, instead of the management server 50, the client server 30 may perform the processing of giving the compensation to the user.

Next, with reference to FIGS. 9 to 16, each processing of the management server will be described. Firstly, with reference to FIGS. 9 and 10, job acceptance processing will be described. FIG. 9 is a processing flow of the job acceptance processing, and FIG. 10 is an explanatory diagram of a job acceptance screen.

As shown in FIG. 9, the management server 50 accepts a request for computational processing of the job data D1 from a client (S11). Specifically, in response to an operation by a person-in-charge of the client of the client, the client server 30 sends a job request application to the management server 50. In response to this application, the control part 505 of the management server 50 performs the following processing.

The control part 505 requests the client server 30 to transmit information required for acceptance of a job (specifically, client information about the client requesting the job, and job/project information about the job and a project). In this embodiment, the control part 505 transmits image data of a job acceptance screen to the client server 30. The control part 305 of the client server 30 reproduces an image of the job acceptance screen from the image data, and outputs (displays) the image onto the output part 302 (display part).

Figure 10:
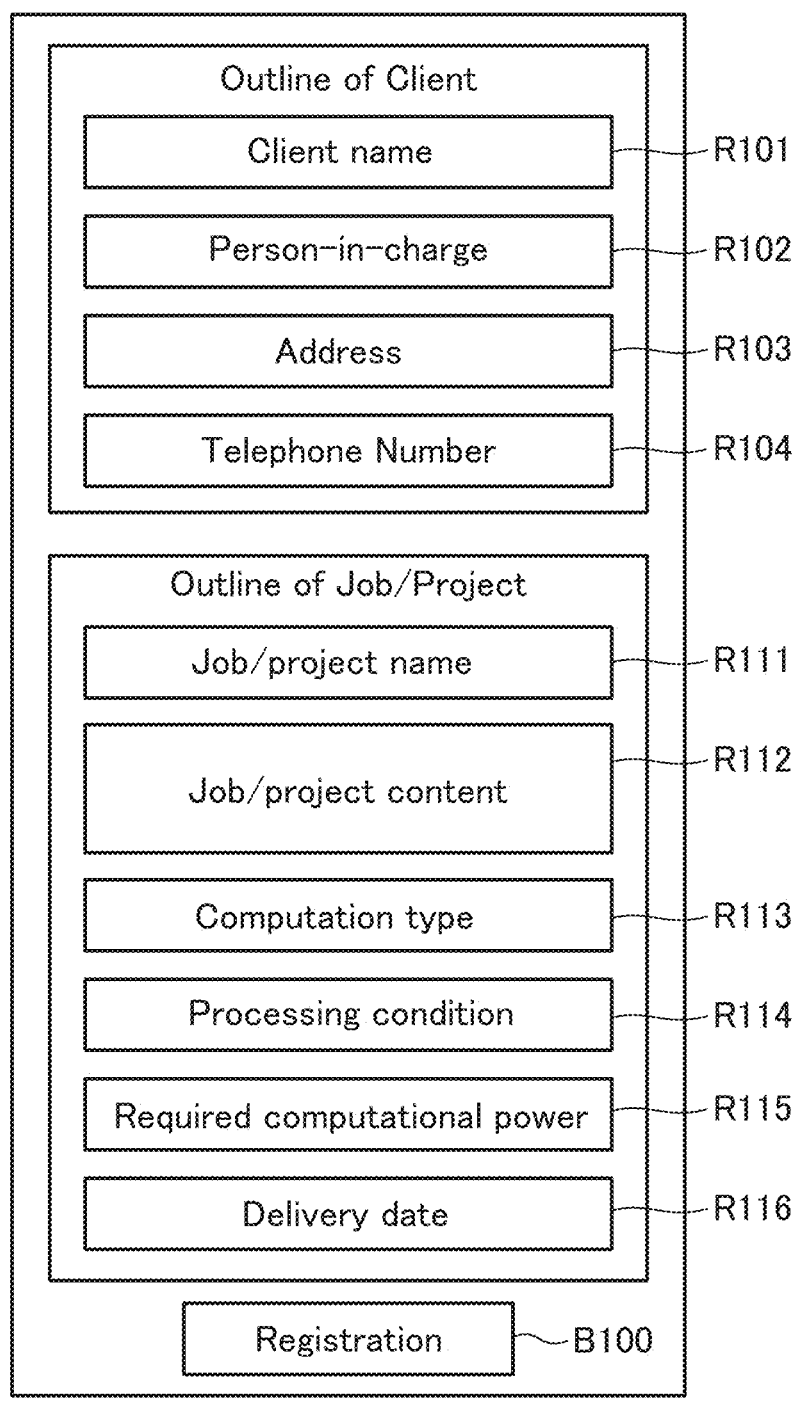
FIG. 10 is an explanatory diagram of a job acceptance screen in the system according to the embodiment.

As shown in FIG. 10, the job acceptance screen is a screen for inputting information required for accepting a job, and includes a client information entry field, a job/project information entry field, and a registration button B100. The client information entry field includes: a client name entry field R101 for inputting the name of a client; a person-in-charge name entry field R102 for inputting the name of a person-in-charge of the client; and an address entry field R104 for inputting the address of the client. Further, the job/project information entry field includes: a job/project name entry field R111 for inputting the names of the job and project; a job/project content entry field R112 for inputting an explanation of the contents of the job and project; a computation type entry field R113 for inputting a computation type of the job data corresponding to the job; a processing condition entry field R114 for inputting a processing condition of the job data; a required computational power entry field R115 for inputting a required computational power of the job data, and a delivery date entry field R116 for inputting a delivery date of the job.

The person-in-charge of the client operates the input part 301 (manual operation part) of the client server 30 to input information required for the job acceptance screen. Thus, the client information about the client requesting the job, and the job/project information about the job and project are input.

Then when the input of these information is completed, the person-in-charge of the client operates the input part 301 (manual operation part) of the client server 30 to press the registration button B100 of the job acceptance screen. When the registration button B100 is pressed, the control part 305 of the client server 30 transmits the information (client information, and job/project information) input to the job acceptance screen to the management server 50. The control part 505 of the management server 50 receives the client information and the job/project information, Then, the control part 505 requests the client server 30 to transmit the job data D1 corresponding to the job. In response to this request, the control part 305 of the client server 30 transmits the job data D1 corresponding to the job to the management server 50. The control part 505 of the management server 50 receives the job data D1.

Subsequently, the control part 505 of the management server 50 analyzes the job data D1 received in the step S11 (S12). Specifically, the control part 505 analyzes the computation type, processing condition, required computational power, etc., of the job data D1. Then, the control part 505 corrects the job/project information received in the step S11, based on the result of the analysis of the job data D1. If the job/project information received in the step S11 is sufficiently reliable, the processing in step S12 may be omitted.

Subsequently, the control part 505 of the management server 50 associates the client information received in the step S11 with the job/project information corrected as needed in the step S12 (or the job/project information received in the step S11), and registers them in the job/project table D54 (S13). Further, the control part 505 stores the job data D1 received in the step S11, in the storage part 504.

Figure 12:
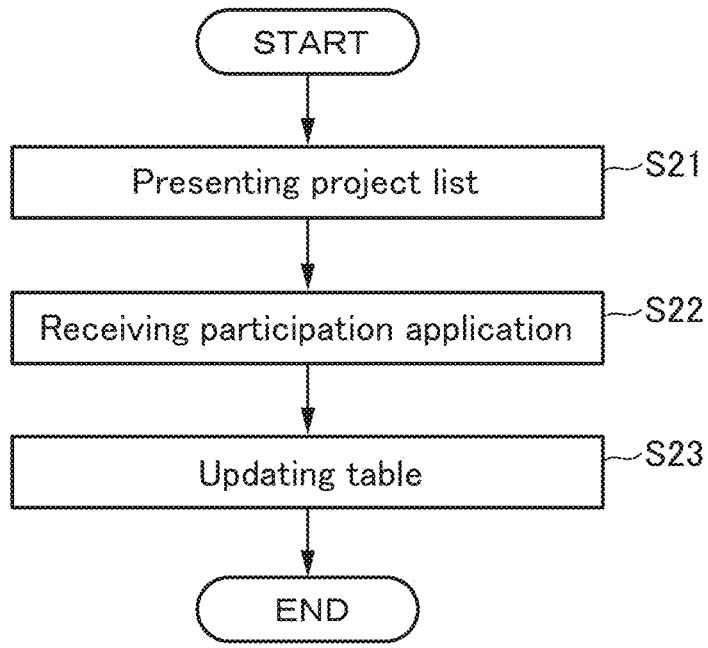
FIG. 12 is a processing flow of project selection processing in the system according to the embodiment.

Next, with reference to FIGS. 11A, 11B and 12, project selection processing will be described. FIGS. 11A and 11B illustrate examples of a project list, and FIG. 12 illustrates a processing flow of the project selection processing. In the project selection processing, the management server 50 presents, to a user, a project list introducing a plurality of projects, and causes the user to select a project to which the user wishes to provide the computational power of the computing device 105.

The project list includes recruitment information about the plurality of projects. With regard to each project, the recruitment information is determined based on the job/project information (project information, job information, project evaluation information, and status information), etc., registered in the job/project table D54. Specifically, the recruitment information includes the name, content, registration date, and schedule completion date of the project, the degree of progress of the project, the name of a client, the computation type of a computational job, the processing condition of the computational job, the required computational power of job data, the content of a compensation, the start date of the recruitment, the end date of the recruitment, the degree of progress of the computational job, the project evaluation information (degree of social influence A, degree of achievement difficulty B, evaluation value C, and status information), etc. As above, the recruitment information includes information for allowing the user to evaluate the value of the job or project when selecting the job or project.

FIGS. 11A and 11B show only major items of recruitment information about five projects. FIGS. 11A and 11B show, with respect to each project, the series number, name, registration date, scheduled completion date, content, degree of progress, degree of social influence A, degree of achievement difficulty B, evaluation value C, degree of progress of computation, and status information. The five projects are an infectious disease new drug development, a drug pre-mass production test, an earthquake prediction, a residential earthquake resistance test, and a new material molecular structure analysis, in order from the top of the list.

The user can refer to the content, degree of progress, project evaluation information, etc. of each project, to select one or more projects to which the computational resource is provided, and designates a computation provision period (e.g. per month). When selecting two or more projects, the user can set an assignment ratio (e.g. computational time ratio) of the computational resource for each project.

First of all, as shown in FIG. 12, in the project selection processing, the control part 505 presents the project list to the user (S21). For example, the project list is presented to the user terminal 20 of the user. Specifically, in response to an operation of the user, the user terminal 20 requests the management server 50 to transmit the project list. In response to the request, the control part 505 of the management server 50 transmits image data of the project list to the user terminal 20. The user terminal 20 reproduces the image of the project list from the image data, and outputs (displays) the image to an output part 202 (display part).

Then, the user selects, from among the projects introduced to the project list presented to the user terminal 20, a project to which the user wishes to provide the computational power of the computing device 105. Specifically, the user operates the input part 201 (manual operation part) of the user terminal 20 to select desired one or more projects from the project list, and input the computation provision period, and a computational resource distribution ratio for each project, to complete participation application information, and then presses a participation button on the screen. In response to depressing the participation button, the control part 205 of the user terminal 20 transmits the participation application information to the management server 50. The control part 505 of the management server 50 receives the participation application information from each user (S22).

Then, based on the received participation application information, the control part 505 of the management server 50 updates the job/project table D54 (S23). Specifically, with respect to each project, the control part 505 registers the "user ID" of the user who submitted the participation application.

Figure 13:
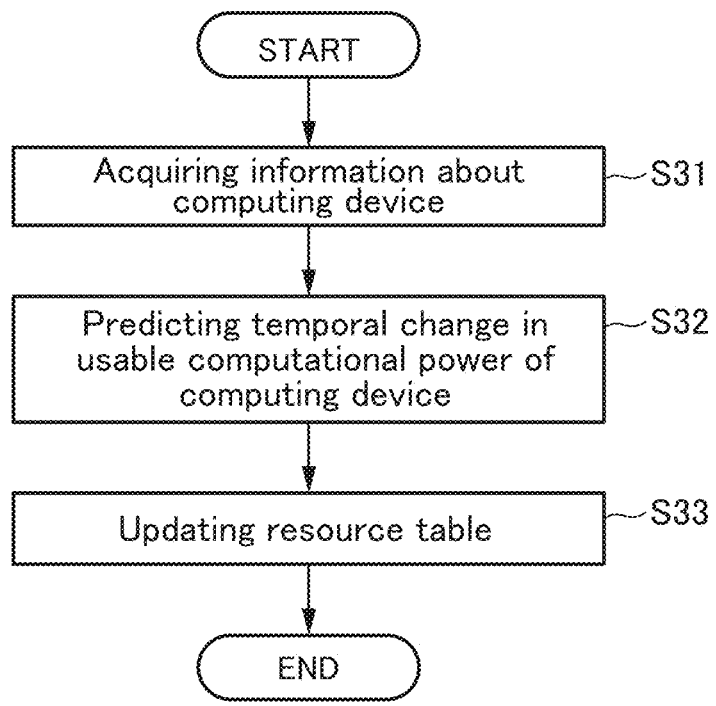
FIG. 13 is a processing flow of prediction processing in the system according to the embodiment.

Next, with reference to FIG. 13, prediction processing will be described. FIG. 13 is a processing flow of the prediction process. In the prediction processing, among the plurality of computing devices 105, a computational power of a computing device 105 usable in the grid computing processing is predicted based on the computing device table D52 (specifically, the computational power information D7 and the operation status information D5) stored in the storage part 504. For example, the control part 505 performs the following processing when the computing device table D52 (specifically at least one of the computational power information D7 and the operation status information D5) stored in the storage part 504 has been updated.

Firstly, the control part 505 acquires the "computational power" and the "operation state" of the computing devices 105 registered in the computing device table D52 (S31). In other words, the control part 505 acquires the computational power information D7 and the operation status information D5 included in the computing device table D52.

Then, with respect to each computing device 105, the control part 505 predicts a temporal change in computational power of the computing device 105 usable in the grid computing processing, based on the computational power of the computing device 105 shown in the computational power information D7 and the operation status of the computing device 105 shown in the operation status information D5 (S32).

Specifically, the control part 505 predicts a tendency (pattern) of a change in usage rate of the computational power of the computing device 105, from the operation status of the computing device 105 shown in the operation status information D5. The prediction of the tendency of the change in the usage rate of the computational power of the computing device 105 may be realized by machine learning. Then, the control part 505 predicts a period during which the computational power of the computing device 105 has a margin (period during which the utilization rate of the computational power is not 100%), based on the tendency of the change in the usage rate of the computational power of the computing device 105, and defines such a period as "a period during which the computational power of the computing device 105 can be used for the grid computing processing". For example, the control part 505 defines a period during which the usage rate of the computational power of the computing device 105 is "30%", as a period during which "70%" of the computational power of the computing device 105 can be used during the grid computing processing.

Then, with respect to each computing device 105, the control part 505 registers the temporal change (predicted in step S32) in the computational power of the computing device 105 usable in the grid computing processing (S33). In this way, the resource table D55 is updated.

Figure 14:
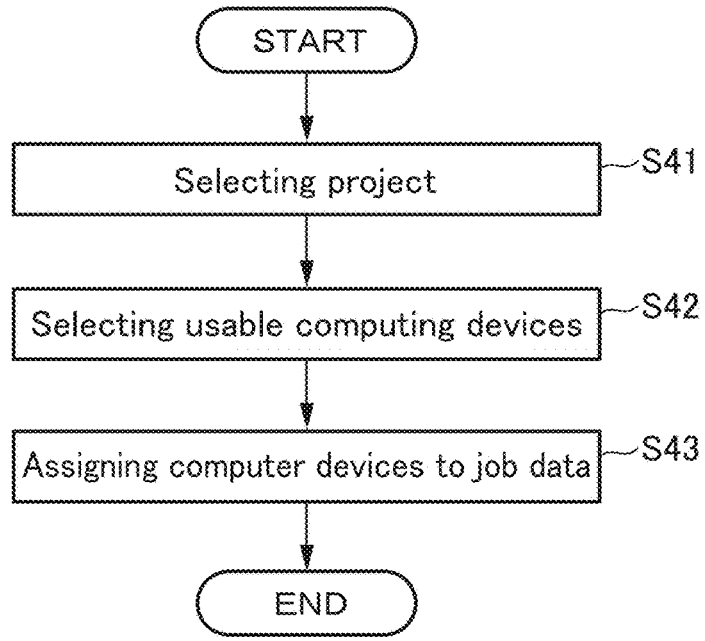
FIG. 14 is a processing flow of matching processing in the system according to the embodiment.

Next, with reference to FIG. 14, matching processing will be described. FIG. 14 is a processing flow of the matching processing. The matching processing is processing of assigning, to the job data D1 accepted in the acceptance processing, some computing devices 105 usable in the grid computing processing, among the plurality of computing devices 105, based on the prediction result of the prediction processing. For example, after completion of the job acceptance processing, the control part 505 performs the following processing.

Firstly, the control part 505 selects a project as the subject of the matching processing from among the projects registered in the job/project table D54 (S41). Then, from among plural pieces of the job data D1 stored in the storage part 504, the control part 505 selects job data D1 corresponding to the project as the subject of the matching processing.

Then, based on the prediction result of the temporal change of the computational power usable in the grid computing processing with regard to each of the plurality of computing devices 105 registered in the resource table D55, the control part 505 selects, from among the plurality of computing devices 105, some computing devices 105 usable during the grid computing processing for the job data D1 selected in the step S41 (S42). Specifically, the control part 505 determines a scheduled computation period during which the grid computing processing for the job data D1 is to be executed, and detects some computing devices 105 each capable of providing the computational power during the scheduled computation period, from among the computing devices 105 of the plurality of users who have submitted the participation application to the relevant project.

Then, with regard to the job data D1, the control part 505 assigns a computation period of each of the computing devices 105. Specifically, the control part 505 sets an assignment period (time and date) of each of the plurality of computing devices 105 related to the participation application, such that the total computational amount to be assigned to the plurality of computing devices 105 related to the participation application becomes equal to or greater than the computational amount of the job data D1 during the scheduled computation period (S43). Then, the control part 505 registers, in the matching table D56, matching result information indicative of assignment of the computing devices 105 to the job data D1. The computational processing of the job data D1 is divided into a large number of computational units, and is continuously or intermittently executed by the computing devices 105 for a predetermined length of scheduled computation period.

Figure 15:
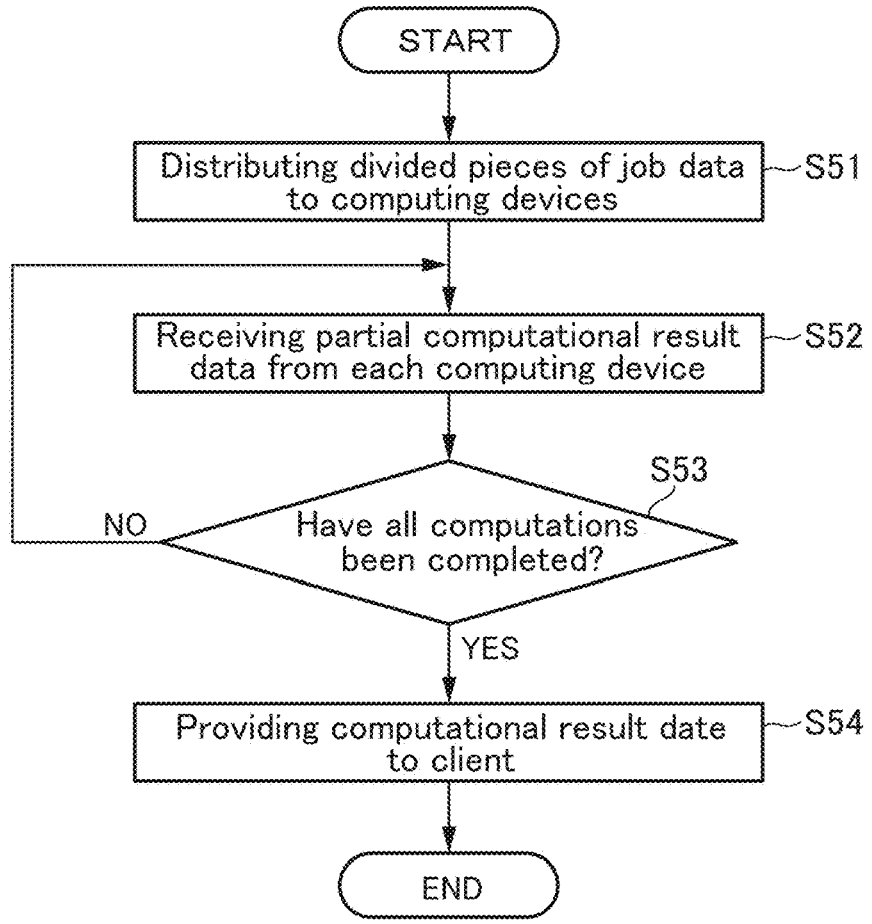
FIG. 15 is a processing flow of grid computing processing in the system according to the embodiment.

Next, with reference to FIG. 15, the grid computing processing will be described. FIG. 15 is a processing flow of the grid computing processing. In the grid computing processing, the job data D1 is processed by the computing devices 105 assigned to the job data D1 among the plurality of computing devices 105. For example, after completion of the matching processing, the control part 505 performs the following processing.

When the computational amount of the job data D1 is relatively large, the computational processing of the job data D1 is divided into a plurality of sessions, and the grid computing processing will be continuously or intermittently performed for a long period of time until the computation of the job data D1 is completed. In this case, the following processing is performed in units of session.

Firstly, the control part 505 refers to the matching table D56 to distribute the job data D1 as the subject of the grid computing processing to the computing devices 105 assigned to the job data D1 in the matching processing (S51). Specifically, the control part 505 transmits parts of the job data D1 to the computing devices 105 assigned to the job data D1, respectively. Thus, the job data D1 is processed in parallel by the computing devices 105 assigned to the job data D1.

Subsequently, when the computation of data (part of the job data D1) transmitted to each of the computing devices 105 is completed, each of the computing devices 105 transmits partial computational result data obtained by the computation, to the management server 50. The control part 505 of the management server 50 receives the partial computational result data transmitted from each of the computing devices 105, and stores the partial computational result data in the storage part 504 (S52). Further, when the management server 50 receives the partial computational results from each of the computing devices 105, it stores the computational amount assigned to each of the computing devices 105 in the job/project table D54.

The control part 505 determines whether all of the computing devices 105 to which the job data D1 is distributed in the step S51 have completed their computations (S53). When all the computing devices 105 have completed the computations, processing of step S54 is performed. On the other hand, if not, the processing of the step S52 is performed.

When all the computing devices 105 have completed the computations, the control part 505 combines the plural pieces of partial computational result data stored in the storage part 504 to generate computational result data D2 corresponding to the job data D1 as the subject of the grid computing processing (computational result data D2 indicative of the result of computation of the job data D1). Then, the control part 505 transmits the computational result data D2 corresponding to the job data D1 as the subject of the grid computing processing, to the client server 30 of the client requesting the computation of the job data D1 (S54). Further, the control part 505 turns on and stores an end flag of the session.

Figure 16:
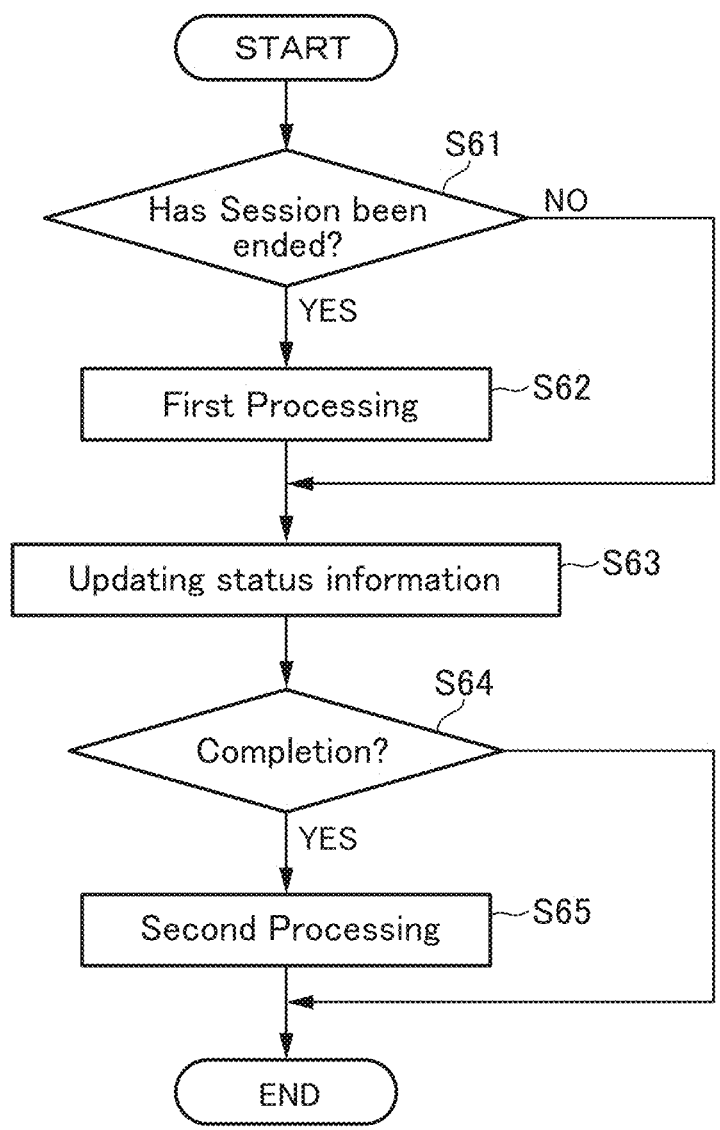
FIG. 16 is a processing flow of second processing of compensation calculation processing in the system according to the embodiment.

Next, with reference to FIG. 16, a compensation calculation processing will be described. FIG. 16 is a processing flow of the compensation calculation processing. After completion of the session of each computational job and/or periodically, the control part 505 of the management server 50 executes the compensation calculation processing for each uncompleted project.

The control part 505 determines whether the session of each project has ended (S 61). Specifically, when the session end flag is in an ON state (S61: YES), the control part 505 executes first processing of the compensation calculation processing and turns off the end flag (S62). More specifically, the control part 505 calculates a compensation (first compensation EP) to be given from the operator operating the system 1 to a user who provided the computational power of the computing device 105 to the grid computing process of the relevant session.

As the first processing of the compensation calculation processing, the control part 505 calculates the first compensation value Rp of the first compensation EP by multiplying the computational amount Q (the number of computational units) executed in the relevant session by each computing device 105 by the compensation factor Ec (Rp=Q×Ec). The calculated first compensation value Rp is registered in the user table D51 in association with the "user ID" of each user. The calculation amount Q of each user in the relevant session and the compensation factor Ec of each user are stored in the user table D51.

On the other hand, when the session end flag is in an OFF state (S61: NO) and the first processing (S62) is terminated, the control part 505 updates the status information (S 63). Therefore, with regard to the relevant project, the control part 505 acquires the degree of progress thereof and the degree of progress of the job thereof, from the job/project table D54. When the degree of progress of the project received from the client is 100%, and the degree of progress of the job is 100%, the control part 505 updates the status information to "complete".

Then, when the status information is "complete" (S 64: YES), the control part 505 executes second processing (S65). On the other hand, if the status information is not "complete" or has been previously "completion" (S 64; NO), the control part 505 terminates the processing.

As the second processing of the compensation calculation processing, the control part 505 calculates the second compensation value Rs of the second compensation ES by multiplying the total computational amount QT (the number of total computational units) executed by each computing device 105 by the evaluation value C which is a compensation rate (Rs=QT×C). The calculated second compensation value Rs of the second compensation ES is registered in the user table D51 in association with the "user ID" of each user. At this time, the control part 505 adds the second compensation values Rs given to each user together and registers the cumulative value Rst in the user table D51.

It should be noted here that the second compensation value Rs is not necessarily proportional to the total computational amount QT, but may be a fixed value. For example, the fixed value may be varied depending on the time when a user submits a participation application. Specifically, the management device 50 may set the project list such that the second compensation value Rs increases as the timing when a user submits a participation application becomes earlier.

Next, the operation/function of the management device and the management method according to the above embodiment will be described.

According to the above embodiment, there is provided a management device 50 used in a grid computing system 1 in which the management device 50 causes a computing device 105 of a user connected thereto via a communication network 5 to computationally process a computational job D1 selected by the user from among a plurality of computational jobs D1 accepted from a client, wherein the computational job D1 constitutes a part of a project to be implemented by the client, the management device 50 being configured to: store a content of the project, and a compensation rate C set for the computational job D1 of the project; acquire a computational amount Q of computational processing executed for the computational job D1 by the computing device 105; calculate a first compensation value Rp of a first compensation EP to be given to the user, according to the computational amount Q by the computing device 105; and acquire a degree of progress of the project, and when it is determined, based on the acquired degree of progress, that the project has been completed, calculate a second compensation value Rs of a second compensation ES to be given to the user, according to the compensation rate C.

In the above embodiment having above feature, when the user provides computational processing power of the computing device 105, the managing device 50 calculates the first compensation value Rp of the first compensation EP to be given to the user, according to a computational amount Q provided for the computing job D1. Further, when the project itself comprising the operation job D1 has been completed, the management device 50 calculates the second compensation value Rs of the second compensation ES, according to the compensation rate C set for the project. Thus, in the present invention, instead of simply providing the computational power of the computing device 195 to the computational job D1, a user will consider selecting a computational job D1 with reference to the content of a project and the compensation rate so as to most efficiently obtain the first compensation value Rp and the second compensation value Rs. In this manner, it becomes possible to provide motivation or a mechanism to actively provide a computational resource when a user provides the computational resource.

In the above embodiment, the management device 50 is configured to provide the content of the project and the compensation rate C to the user via the communication network (S21). According to this feature, the user can select a participating computational job D1 by referring to the compensation rate C of each computational job D1.

In the above embodiment, the management device 50 accepts, from the user via the communication network, a selection of a computational job D1 to which computational processing of the computing device 105 is to be provided, and causes the computing device to execute computational processing of the selected computational job (S22). According to this feature, the management device 50 can cause the user who submitted a participation application via the communication network to participate in the grid computing.

In the above embodiment, the management device calculates the first compensation value Rp according to the computational amount Q by the computing device 105, even if it is not determined that the project has been completed. According to this feature, the user can obtain the first compensation value Rp for the provision of computational power by the computing device, irrespective of the completion of the project.

In the above embodiment, the management device 50 is configured to calculate the first compensation value Rp to have a larger value as a cumulative value Rst of the second compensation values Rs which have been given to the user has a larger value. According to this feature, the user will try to select a computational job D1 in consideration of the compensation rate C of the computational job D1 such that the cumulative value Rst of the second compensation value Rs efficiently increases so as to allow the first compensation value Rp which can be obtained by the same computational amount Q to increase. Thus, it is possible to construct a mechanism in which, instead of simply selecting a computational job D1, a user actively makes a determination on a computational job D1, preferably, by referring to the compensation rate C of the computational job D1 and the content of a project, and becomes more likely to ferment awareness of social contribution to the provision of a computational resource.

In the above embodiment, the management device 50 calculates the second compensation value Rs of the second compensation ES to be given to the user, according to a total computational amount QT of computational processing executed for the computational job D1 by the computing device 105, and the compensation rate C. According to this feature, the user can obtain more the second compensation value Rs as the compensation rate C has a larger value. More specifically, the management device 50 may calculate the second compensation value Rs by multiplying the total computational amount QT by the compensation rate C.

According to the above embodiment, there is also provided a management method used in a grid computing system 1 in which a management device 50 causes a computing device 105 of a user connected thereto via a communication network 5 to computationally process a computational job D1 selected by the user from among a plurality of computational jobs D1 accepted from a client, wherein the computational job D1 constitutes a part of a project to be implemented by the client, the management method comprising: a step of storing, by the management device 50, a content of the project, and a compensation rate C set for the computational job D1 of the project (S13); a step of acquiring, by the management device 50, a computational amount Q of computational processing executed for the computational job D1 by the computing device 105 (S62); a first step of calculating, by the management device 50, a first compensation value Rp of a first compensation EP to be given to the user, according to the computational amount Q by the computing device 105 (S62); and a second step of acquiring, by the management device 50, a degree of progress of the project, and when it is determined, based on the acquired degree of progress, that the project has been completed, calculating a second compensation value Rs of a second compensation ES to be given to the user, according to the compensation rate C (S65).

LIST OF REFERENCE SIGNS

1: system
10: vehicle
105: computing device
20: user terminal
30: client server
40: facility server
50: management server (management device)
D1: job data (computational job)
D2: computational result data

The invention claimed is:

1. A management device used in a grid computing system in which the management device causes a computing device of a user connected thereto via a communication network to computationally process a computational job selected by the user from among a plurality of computational jobs accepted from a client, wherein the computational job constitutes a part of a project to be implemented by the client, the management device being configured to:
    store a content of the project, and a compensation rate set for the computational job of the project;
    acquire a computational amount of computational processing executed for the computational job by the computing device;
    calculate a first compensation value of a first compensation to be given to the user, according to the computational amount by the computing device; and
    acquire a degree of progress of the project, and when it is determined, based on the acquired degree of progress, that the project has been completed, calculate a second compensation value of a second compensation to be given to the user, according to the compensation rate.

2. The management device as claimed in claim 1, wherein the management device is configured to provide the content of the project and the compensation rate to the user via the communication network.

3. The management device as claimed in claim 1, wherein the management device accepts, from the user via the communication network, a selection of a computational job to which computational processing of the computing device is to be provided, and causes the computing device to execute computational processing of the selected computational job.

4. The management device as claimed in claim 1, wherein the management device calculates the first compensation value according to the computational amount by the computing device, even if it is not determined that the project has been completed.

5. The management device as claimed in claim 1, wherein the management device is configured to calculate the first compensation value to have a larger value as a cumulative value of the second compensation values which have been given to the user has a larger value.

6. The management device as claimed in claim 1, wherein the management device calculates the second compensation value of the second compensation to be given to the user, according to a total computational amount of computational processing executed for the computational job by the computing device, and the compensation rate.

7. The management device as claimed in claim 6, wherein the management device calculates the second compensation value by multiplying the total computational amount by the compensation rate.

8. A management method used in a grid computing system in which a management device causes a computing device of a user connected thereto via a communication network to computationally process a computational job selected by the user from among a plurality of computational jobs accepted from a client, wherein the computational job constitutes a part of a project to be implemented by the client, the management method comprising:
    a step of storing, by the management device, a content of the project, and a compensation rate set for the computational job of the project;
    a step of acquiring, by the management device, a computational amount of computational processing executed for the computational job by the computing device;

a first step of calculating, by the management device, a first compensation value of a first compensation to be given to the user, according to the computational amount by the computing device; and a second step of acquiring, by the management device, a degree of progress of the project, and when it is determined, based on the acquired degree of progress, that the project has been completed, calculating a second compensation value of a second compensation to be given to the user, according to the compensation rate.

\* \* \* \* \*